United States Patent
Nair et al.

(10) Patent No.: US 9,509,367 B2
(45) Date of Patent: Nov. 29, 2016

(54) METHOD AND APPARATUS FOR CHANNEL MITIGATION USING PER-TONE SPREADING IN SINGLE CARRIER BLOCK TRANSMISSIONS

(71) Applicant: Samsung Electronics Co., Ltd., Suwon-si (KR)

(72) Inventors: Jinesh P. Nair, Bangalore (IN); Sujit Jos, Bangalore (IN); Preeti Nagvanshi, Bangalore (IN); Arun Naniyat, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/293,139

(22) Filed: Jun. 2, 2014

(65) Prior Publication Data

US 2014/0301431 A1 Oct. 9, 2014

Related U.S. Application Data

(63) Continuation of application No. PCT/KR2012/010347, filed on Nov. 30, 2012.

(30) Foreign Application Priority Data

Dec. 1, 2011 (IN) ............................ 4173/CHE/2011
Nov. 22, 2012 (IN) ............................ 4173/CHE/2011

(51) Int. Cl.
*H04B 1/69* (2011.01)
*H04B 1/7097* (2011.01)
*H04L 5/00* (2006.01)
*H04L 27/26* (2006.01)

(52) U.S. Cl.
CPC ........... *H04B 1/7097* (2013.01); *H04L 5/0017* (2013.01); *H04L 27/2636* (2013.01); *H04L 27/2647* (2013.01)

(58) Field of Classification Search
CPC ............. H04L 5/0017; H04L 27/2634; H04L 27/2636; H04B 1/7097
See application file for complete search history.

(56) References Cited

U.S. PATENT DOCUMENTS

| | | | |
|---|---|---|---|
| 5,245,612 A * | 9/1993 | Kachi et al. ................... | 370/324 |
| 6,937,665 B1* | 8/2005 | Vandenameele ....... | H04B 1/707 370/210 |
| 2003/0086366 A1 | 5/2003 | Branlund et al. | |
| 2004/0120274 A1* | 6/2004 | Petre et al. .................... | 370/320 |
| 2004/0179582 A1* | 9/2004 | Suzuki ................ | H04B 1/7183 375/145 |
| 2005/0105588 A1* | 5/2005 | Giannakis et al. ........... | 375/130 |
| 2005/0233752 A1 | 10/2005 | Laroia et al. | |
| 2007/0115795 A1* | 5/2007 | Gore et al. .................... | 370/203 |

FOREIGN PATENT DOCUMENTS

EP 1 039 683 A2 9/2000
EP 1 545 083 A1 6/2005

OTHER PUBLICATIONS

International Search Report mailed Mar. 18, 2013 in International Application No. PCT/KR2012/010347 (4 pages, in English).

* cited by examiner

*Primary Examiner* — David B. Lugo
(74) *Attorney, Agent, or Firm* — NSIP Law (57) ABSTRACT

A method of per-tone spreading in single carrier block transmissions, includes generating a block of modulated symbols, and performing the per-tone spreading on the block of the modulated symbols. Also, a transmitter configured to perform per-tone spreading in single carrier block transmissions, includes a modulator configured to generate a block of modulated symbols, and a spreader configured to perform the per-tone spreading on the block of the modulated symbols.

10 Claims, 7 Drawing Sheets

METHOD AND APPARATUS FOR CHANNEL MITIGATION USING PER-TONE SPREADING IN SINGLE CARRIER BLOCK TRANSMISSIONS

CROSS-REFERENCE TO RELATED APPLICATIONS

This application is a continuation of International Application No. PCT/KR2012/010347 filed on Nov. 30, 2012, which claims the benefit of Indian Application No. 4173/CHE/2011, filed on Dec. 1, 2011, and Nov. 22, 2012, in the Indian Patent Office, the entire disclosures of which are incorporated herein by reference for all purposes.

BACKGROUND

1. Field

The following description relates to a method and an apparatus for channel mitigation using per-tone spreading in single carrier block transmissions.

2. Description of Related Art

Single carrier block transmission (SCBT) is an attractive technique for wireless communications. SCBT is becoming all the more important as evident in its adoption in emerging standards like IEEE 802.11ad in the form of single carrier frequency domain equalization (SC-FDE) and also in long term evolution (LTE) release 8 uplink in the form of single carrier frequency division multiple access (SC-FDMA). The advantages of SCBT are the simplified transmitter, transmit signal characteristics and performance enhancement capabilities at the receiver using non-linear equalization techniques.

The concept of sub-banding is developed for wide band systems in recent times. With this concept, power saving is achieved in ultra wide band (UWB) systems. Several technologies based on personal area networks (PANs) make use of this band for building applications that can achieve medium to high data communication rates. In the method of sub-banding, a given bandwidth of 500 MHz (or more) is divided equally into 'N' sub-bands. These 'N' sub-bands can be used for providing multiple users access to channel bandwidth, for increasing rates of data communication by using different sub-bands for transmitting different data streams and improving communication performance by using different sub-bands for transmitting a same data stream.

Further, the data transmitted in each of the sub-bands are combined with unique orthogonal codes prior to transmission. When data streams are transmitted to multiple users, orthogonal codes, unique to each user, are used. When different data streams are transmitted to a same user, the orthogonal codes which are unique to each of the different data streams are used. If the orthogonal codes are applied to a same data stream transmitted in all of the sub-bands, the codes act as spreading sequences for interference rejection. When the orthogonal codes are applied to different data streams transmitted in each of the sub-bands, they can be used for rejecting the sub-bands carrying a different data stream. The method of transmitting orthogonal codes along with the data streams also helps in reducing the complexity of receiver at the one or more user nodes.

In sub-band ultra wide band (S-UWB), the transmitting device includes a plurality of sub-band signal generators for generating a plurality of sub-band signals based on the determined parameters, where each of the plurality of sub-band signals includes modulated bit streams spread using spreading codes. Further, at the receiver side, a receiving device of a sub-band ultra-wide band (S-UWB) communication system includes an analogue front end for receiving an S-UWB signal including a plurality of sub-band signals from a transmitting device over a UWB channel, where each of the plurality of sub-band signals include modulated bit streams spread using spreading codes. The receiving device also includes a sampler for sampling the S-UWB signal at rate of the sub-band bandwidth. Moreover, the receiving device includes a de-spreader for de-spreading the sampled S-UWB signal by filtering the sampled S-UWB signal at a cut-off bandwidth equal to a bit stream modulated symbol rate.

A major power consuming block in wideband systems like 60 GHz and UWB is the analog to digital converter (ADC) at the receiver. Further, in wide band systems, there has been the problem of inferior peak to average power ratio (PAPR) characteristics. This is especially severe in wideband systems thus limiting the performance or communicating range of the system.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of per-tone spreading in single carrier block transmissions, the method including generating a block of modulated symbols, and performing the per-tone spreading on the block of the modulated symbols.

The performing may include performing the per-tone spreading in a sub-band of the single carrier block transmissions, or for a user of the single carrier block transmissions.

The performing may include multiplying the block of the modulated symbols with each of chips of a spreading sequence among spreading sequences that are orthogonal to each other.

A number of multiplications of the modulated symbols with each of the chips may be equal to a number of the chips.

The method may further include inserting a guard symbol after the block of the modulated symbols, in response to the performing of the per-tone spreading.

The generating and the performing may be performed in each of sub-bands of the single carrier block transmissions, or for each of users of the single carrier block transmissions.

A non-transitory computer-readable storage medium may store a program including instructions to cause a computer to perform the method.

In another general aspect, there is provided a transmitter configured to perform per-tone spreading in single carrier block transmissions, the transmitter including a modulator configured to generate a block of modulated symbols, and a spreader configured to perform the per-tone spreading on the block of the modulated symbols.

The spreader may be configured to perform the per-tone spreading in a sub-band of the single carrier block transmissions, or for a user of the single carrier block transmissions.

The spreader may be configured to multiply the block of the modulated symbols with each chip of a spreading sequence among spreading sequences that are orthogonal to each other.

The transmitter may further include a guard symbol inserter configured to insert a guard symbol after the block of the modulated symbols, in response to the performing of the per-tone spreading.

In still another general aspect, there is provided a receiver configured to perform per-tone de-spreading in single carrier block transmissions, the receiver including a de-spreader configured to perform de-spreading in a frequency domain on a block of modulated symbols that is received from a transmitter.

The de-spreader may be configured to perform the per-tone de-spreading in a sub-band of the single carrier block transmissions, or for a user of the single carrier block transmissions.

The receiver may further include a guard symbol remover configured to remove a guard symbol inserted by the transmitter from the block of the modulated symbols. The receiver may be configured to aggregate the block of the modulated symbols into blocks of length equal to the block of the modulated symbols, in response to the removing of the guard symbol.

The receiver may further include a fast Fourier transform (FFT) configured to perform a discrete Fourier transform (DFT) on the block of the modulated symbols with a number of DFT points equal to a number of the modulated symbols in the block.

The de-spreader may be configured to multiply a spreading sequence with modulated samples outputted from the FFT along each tone.

The receiver may further include an analog-to-digital converter configured to sample a sub-band received from the transmitter at a sub-band bandwidth rate to generate a sub-sampled sub-band before the performing of the de-spreading in the sub-sampled sub-band.

The de-spreader may be configured to perform the de-spreading on all received samples across all tones.

The receiver may further include a feed forward equalizer configured to perform linear equalization in the frequency domain to generate equalized samples.

The receiver may be configured to perform an inverse discrete Fourier transform to detect and decode the modulated symbols.

In yet another general aspect, there is provided a method of per-tone de-spreading in single carrier block transmissions, the method including performing de-spreading in a frequency domain on a block of modulated symbols that is received from a transmitter.

The performing may include performing the per-tone de-spreading in a sub-band of the single carrier block transmissions, or for a user of the single carrier block transmissions.

The method may further include removing a guard symbol inserted by the transmitter from the block of the modulated symbols.

The method may further include performing a discrete Fourier transform (DFT) on the block of the modulated symbols with a number of DFT points equal to a number of the modulated symbols in the block.

The performing may include multiplying a spreading sequence with modulated samples outputted from the performing of the DFT along each tone.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Examples described herein include a method and an apparatus that mitigate channel effects in wideband systems at a sub-sampled rate. Further, the method provides multiple accesses using spread spectrum for single carrier frequency domain equalization (SC-FDE) systems. The method and apparatus employ per-tone spreading and frequency domain de-spreading for the sub-band based SC-FDE systems and also a system for multiple accesses in single carrier block transmissions.

Figure 1:
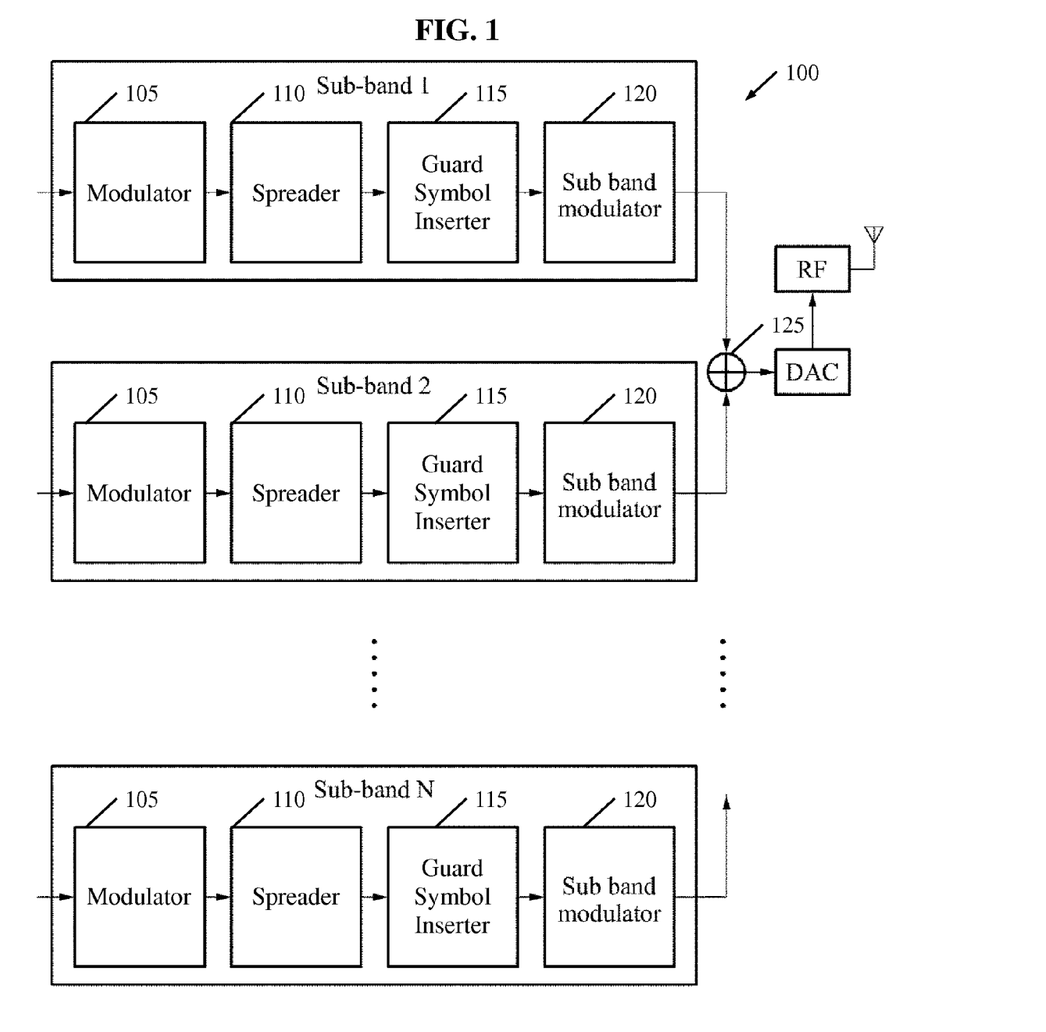
FIG. 1 is a block diagram illustrating an example of a sub-band based SC-FDE transmitter.

FIG. 1 is a block diagram illustrating an example of a sub-band based SC-FDE transmitter 100. In the sub-band SC-FDE transmitter 100, an entire bandwidth (B) is divided into a plurality of sub bands, namely, subband 1, sub band 2 and so on up to sub-band N. In other words, the entire bandwidth is divided into N sub-bands. If B is the total bandwidth available, and N is the number of sub-bands into which the bandwidth is divided, then a bandwidth of each of the sub-bands is B/N.

In the sub-bands of the transmitter 100, modulators 105 generate modulated data symbols, using, for example, M-ary phase shift keying (M-PSK) and/or Mary quadrature amplitude modulation (M-QAM), from binary digits. Blocks of such symbols are formed depending on a size of a fast Fourier transform (FFT) used at a corresponding receiver.

In the sub-bands of the transmitter 100, spreaders 110 perform per-tone spreading on the modulated data symbols. Sequences used for the spreading are unique to the corresponding sub-band when different sub-bands transmit different data or different sub-bands transmit different users. Further, the sequences used for the spreading are the same when frequency diversity is used to improve the performance. The concept of per-tone spreading is explained in FIG. 2 and FIG. 3.

In the sub-bands of the transmitter 100, guard symbol inserters 115 insert guard symbols in the respective spread data symbols. These guard symbols are inserted to ensure that distinct transmissions do not interfere with one another. These transmissions may belong to different users (as in TDMA) or to the same user (as in OFDM). The purpose of the guard symbol insertion is to introduce immunity to propagation delays, echoes and reflections, to which digital data is normally very sensitive.

In the sub-bands of the transmitter 100, sub band modulators 120 modulate respective outputs of the guard symbol inserters 115 to occupy the appropriate sub-bands. In an example, these outputs are multiplied by an angular frequency to occupy appropriate sub-bands.

Further, an adder 125 combines the sub-bands, namely, sub-band 1, sub-band 2 and so on up to sub-band N, and transmits the combined sub-bands as a signal through a wideband channel.

The transmitter 100 described herein may improve peak to average power ratio (PAPR) characteristics in comparison to the orthogonal frequency division multiplexing (OFDM). Further, the transmitter 100 may be simplified as no DFT operations are involved by using per-tone spreading.

Figure 2:
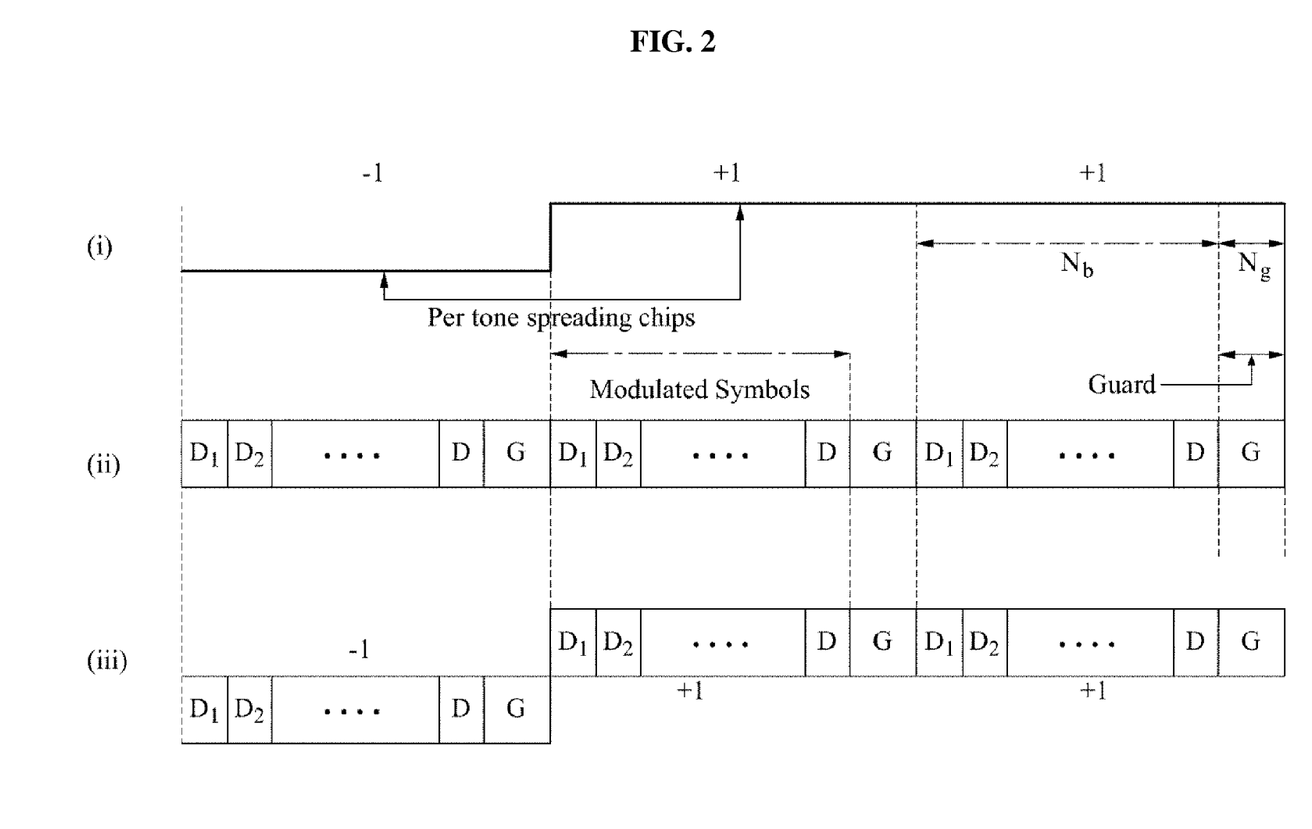
FIG. 2 is a diagram illustrating an example of a method of per-tone spreading at the transmitter.

FIG. 2 is a diagram illustrating an example of a method of per-tone spreading at the transmitter 100. In FIG. 2, Nb represents a number of modulated data symbols in a block. Ng is a number of guard symbols. D represents each of the modulated data symbols, whereas G represents each of the guard symbols.

The method of per-tone spreading involves multiplying each block of the modulated data symbols with each chip of a spreading sequence. In more detail, incoming binary data is divided into blocks, where each block holds a group of data. In FIG. 2, assuming a length of a spreading code is L, a first chip is multiplied with all the blocks. A chip represents a single pulse of a spreading code. Each spreading code has a plurality of pulses, namely, +1 or −1, whereas a chip rate represents a rate at which a pulse is being transmitted. For example, if there exists eight chips, namely, c1, c2, c3 and so on up to c8, then a first block is multiplied with c1, second block is multiplied with c2, and so on until an eight block is multiplied with c8. Further, if there exists a ninth block (there can be incoming data which can flow continuously), then a ninth block is multiplied with c1 (the first chip), and the same procedure is repeated.

In other words, the per-tone spreading operation involves dividing the incoming data into different blocks, and multiplying the blocks with different chips. Each block includes a set of data, and all the data is multiplied with a chip. Suppose, if a chip is multiplied with different data in each block, then it cannot represent a per-tone spreading operation. Each block having a set of data is to be multiplied with a chip to achieve the method of per-tone spreading.

Hence, each block of symbols is multiplied with a chip of a spreading sequence, and then a guard symbol is inserted. In an example, the guard symbol inserted can be a cyclic prefix, a padding of zeros, or a pseudo noise sequence. In this way, a block of modulated symbols is multiplied by all respective chips of the per-tone spreading sequences. A number of times such a multiplication of a block of modulated symbols is carried out depends on a spreading factor (P) of the spreading sequences. Such an operation is performed on one or more blocks of data symbols in a frame. Each of the per-tone spreading chips in FIG. 2 can be either +1 or −1. Referring to FIG. 2, to perform a per-tone spreading operation, each of the per-tone spreading chips in (i) is multiplied with the modulated symbol block in (ii) to generate a desired output illustrated in (iii).

Figure 3:
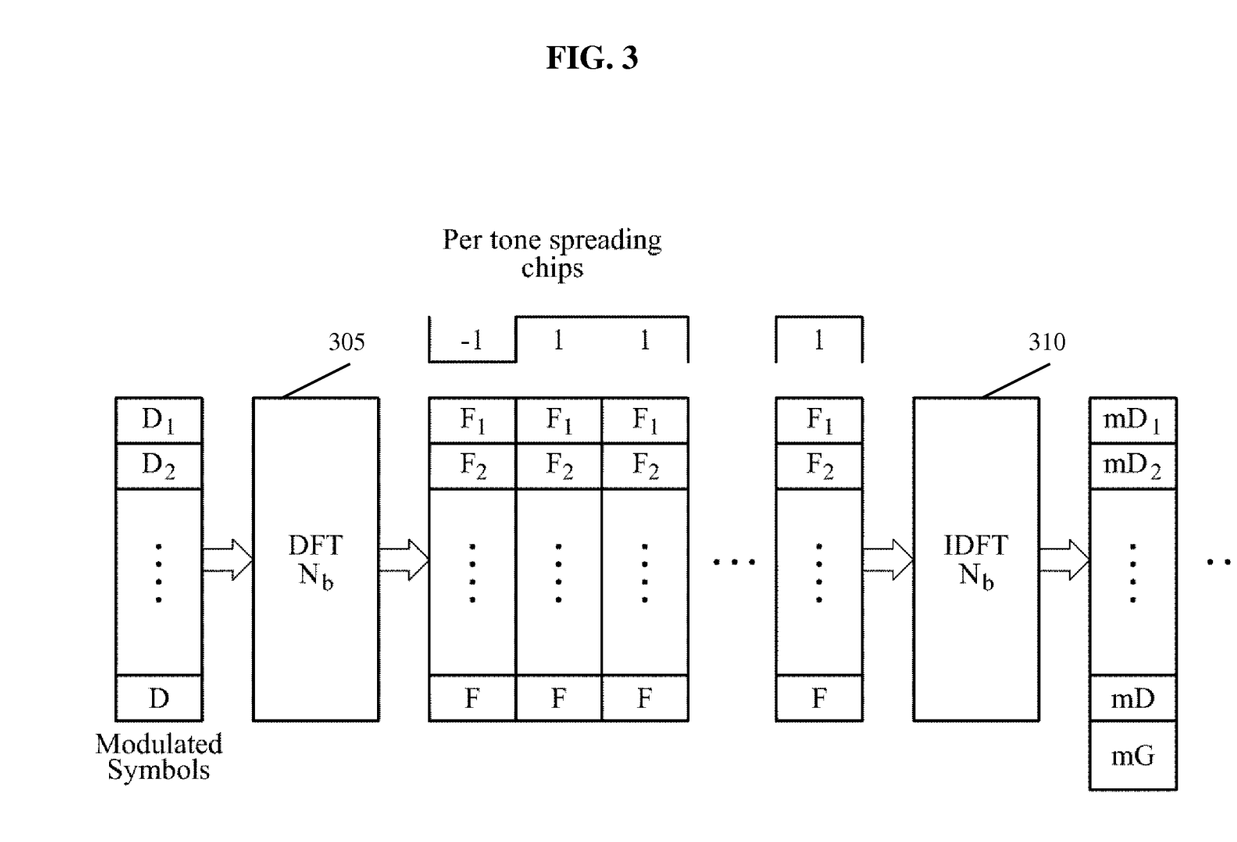
FIG. 3 is a diagram illustrating an example of an architecture for per-tone spreading.

FIG. 3 is a diagram illustrating an example of an architecture for per-tone spreading. The per-tone spreading operation described in FIG. 2 can performed in another example, using a pair of discrete Fourier transform (DFT) and inverse discrete Fourier transform (IDFT) operations and a spreading operation. In FIG. 3, D represents each of modulated data symbols, G represents each of guard symbols, and F represents each of DFT output samples. Initially, a Nb point DFT operation 305 is performed on a block of the modulated data symbols.

Each symbol of the DFT output samples is spread using each of per tone spreading chips included in a spreading sequence. The spreading sequence used for each sample of the DFT output samples is the same. In this way, along each tone, a number of samples is increased depending on a spreading factor.

A Nb point IDFT operation 310 is performed on an ensemble of the first chip across all the tones, and appropriate guard symbols are introduced. In FIG. 3, a value of m may represent all +1s or all −1s, depending upon the spreading sequences. The previous operation is performed on ensembles of the second chip across all the tones, the third chip across all the tones and so on, depending on the spreading factor. All of these operations can be equivalently performed as described in FIG. 2 of per-tone spreading, which is computationally simpler. Indeed, an equivalence is true only when each sample of the Nb point DFT output samples is spread with the same spreading sequence.

After the per-tone spreading and guard symbol insertion, the symbols are modulated to occupy the appropriate sub-bands. The combination of the sub-bands is then transmitted through the wideband channel. The disclosed method of per-tone spreading at the transmitter 100 and the frequency domain de-spreading at the receiver may provide improved PAPR characteristics in comparison with OFDM. Also the transmitter 100 may be simplified as complex DFT operations are not involved.

Figure 4:
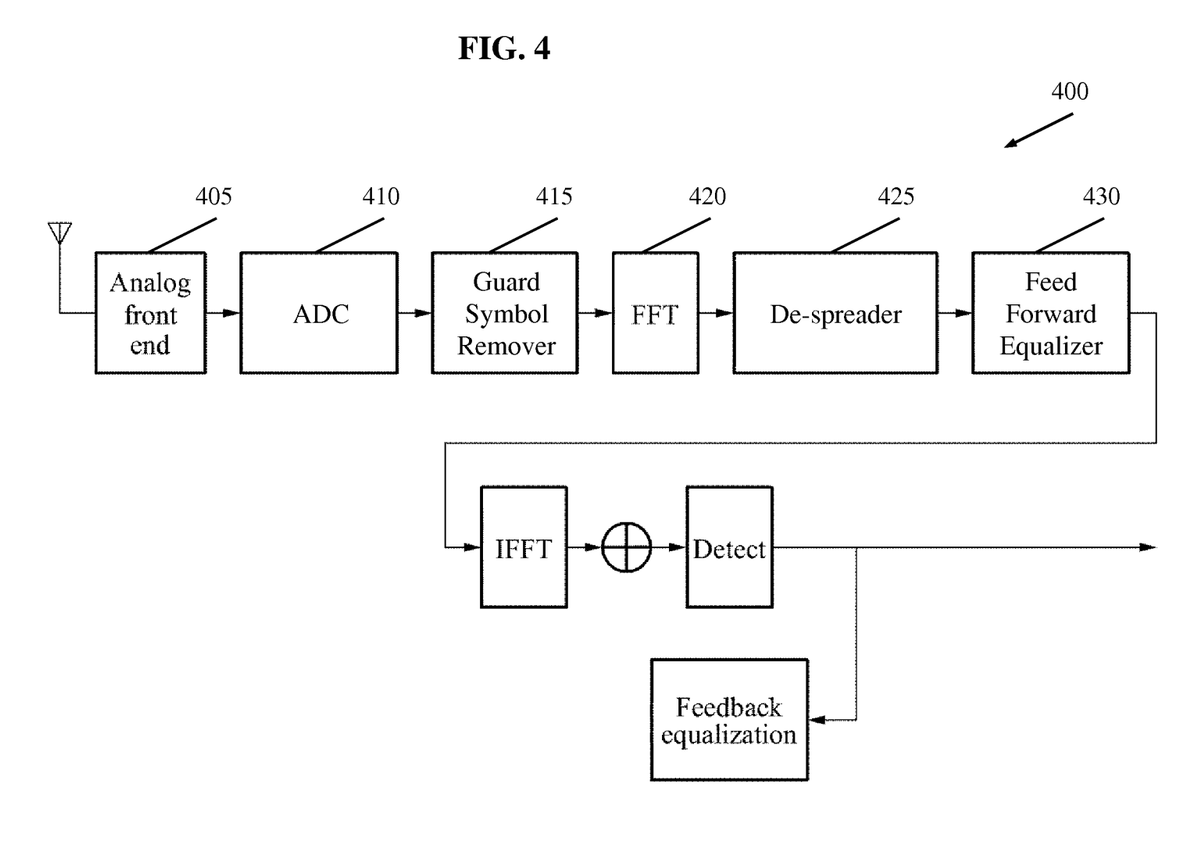
FIG. 4 is a block diagram illustrating an example of a sub-band based SC-FDE receiver.

FIG. 4 is a block diagram illustrating an example of sub-band based SC-FDE receiver 400. In the receiver 400, an analog front end 405 performs analog front end processing of a received signal. An analog-to-digital converter (ADC) 410 samples the received signal at a rate of a sub-band bandwidth (B/N). The received signal band is limited to B/N, is centered on zero, and contains aliased sub-bands. That is, the sampling is done by the ADC 410 at a sub band rate (B/N). Hence, the sampling rate is reduced, which reduces a power consumption in energy constrained devices such as mobile phones. Hence, this technique of sampling at the sub-band rate by the ADC 410 in the receiver 400 in single carrier block transmissions can reduce the power consumption in battery driven mobile devices.

Further, assuming perfect synchronization, a guard symbol remover 415 removes guard symbols from the received signal in an event that cyclic prefixing or zero padding is involved. In this example, the symbols are discarded. A FFT 420 performs a DFT operation on received symbol blocks. In an example in which pseudo-noise (PN) sequences are used, the DFT of Nb+Ng points are taken, and last Ng samples are discarded after performing the DFT.

The DFT operation is performed on a number of the received symbol blocks equal to a spreading factor. A de-spreader 425 performs a de-spreading operation along each tone of the DFT output samples. This involves multiplying the spreading sequence with the samples along each tone of the DFT output samples. Then the symbols are added to complete the de-spreading operation. The correlation properties of the spreading codes ensure that the unwanted sub-bands are removed and only the sub-band of interest is recovered. Such a dispreading operation is performed for all the received symbol blocks. The frequency domain de-spreading is advantageous as the channel fading on each tone is multiplicative, and hence the de-spreading operation is not affected by the time dispersive nature of the channel.

Once the de-spreading operation is completed, a feed forward equalizer 430 performs a one tap frequency domain equalization, using the estimate of the channel coefficients. The equalized symbols are then sent for further typical receiver processing like symbol detection channel decoding and so on. Further, enhancements in the performance at the cost of complexity can be achieved by the use of a feedback filter incorporated into the system after the IDFT operation and using the demodulated symbols.

Although two DFT operations are used in the receiver 400, the overall complexity is appreciably reduced when the sub-sampled OFDM based sub-band system is considered. In the case of the sub-band based SC-FDE system, two DFT operations at the sub-sampled rate is used with a reduced number of points. For the case with the sub-sampled OFDM system a full band FFT is used, and the overall number of FFT points is also high.

Figure 5:
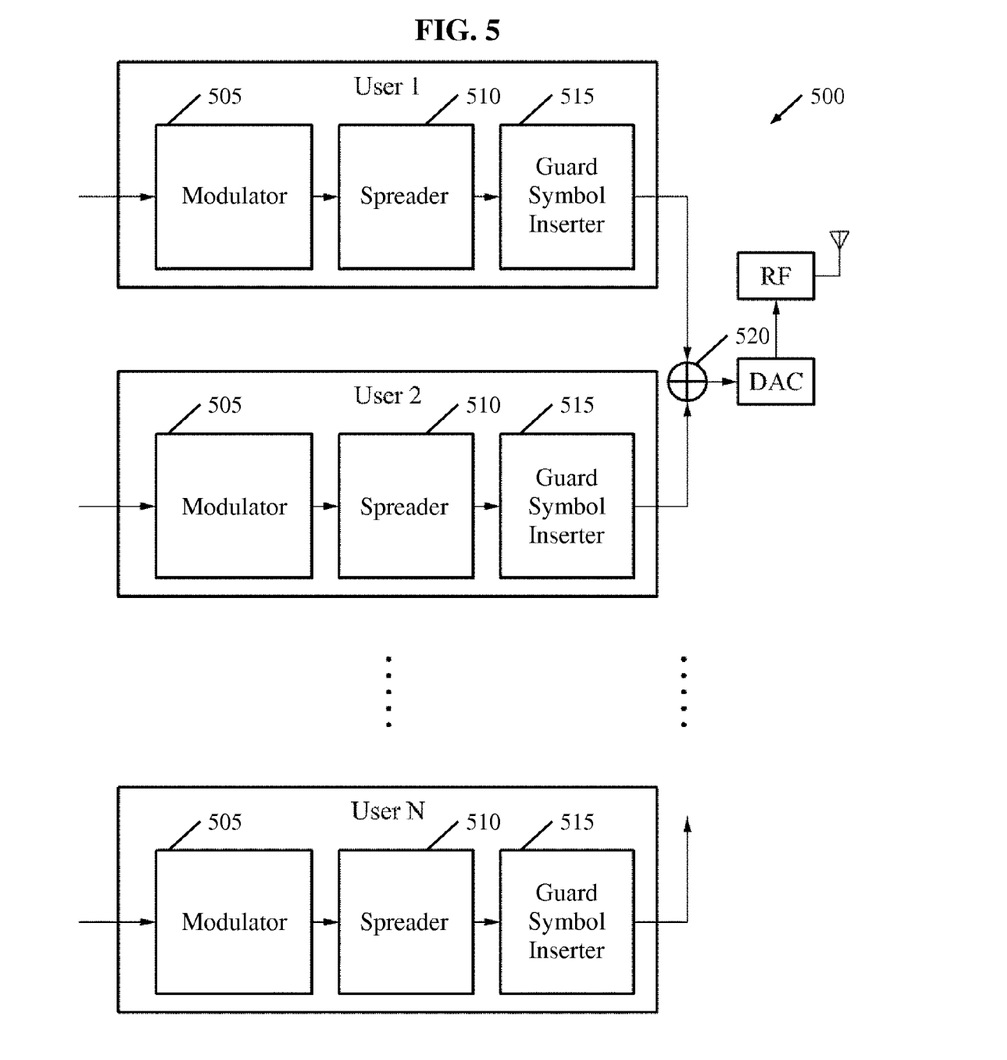
FIG. 5 is a block diagram illustrating an example of a transmitter of a SC-FDE system with per-tone spreading based multiple access in a downlink.

FIG. 5 is a block diagram illustrating an example of a transmitter 500 of a SC-FDE system with per-tone spreading based multiple access in a downlink. In FIG. 5, per-tone spreading can be used to provide multiple accesses among many users employing single carrier block transmissions. All of the users employing single carrier block transmissions share the same bandwidth.

As shown in FIG. 5, the users, namely, user 1, user 2 and so on up to user N, can use the same bandwidth to transmit data. In the transmitter 500, modulators 505 generate modulated data symbols, using, for example, M-PSK or M-QAM, from binary digits for each sub-band. Blocks of such symbols are formed depending on a size of a fast Fourier transform (FFT) used at a corresponding receiver.

Spreaders 510 perform per-tone spreading on the modulated data symbols. Sequences used in the per-tone spreading are unique to the corresponding sub-band when different sub-bands transmit different data or different sub-bands transmit different users. After per-tone spreading, guard symbol inserters 515 insert guard symbols in the spread data symbols.

An adder 520 combines user data, and transmits the combined user data in a wideband channel. The users are separable from each other using the orthogonal codes. Further, a user can recover his/her data from a base station using his/her code.

Figure 6:
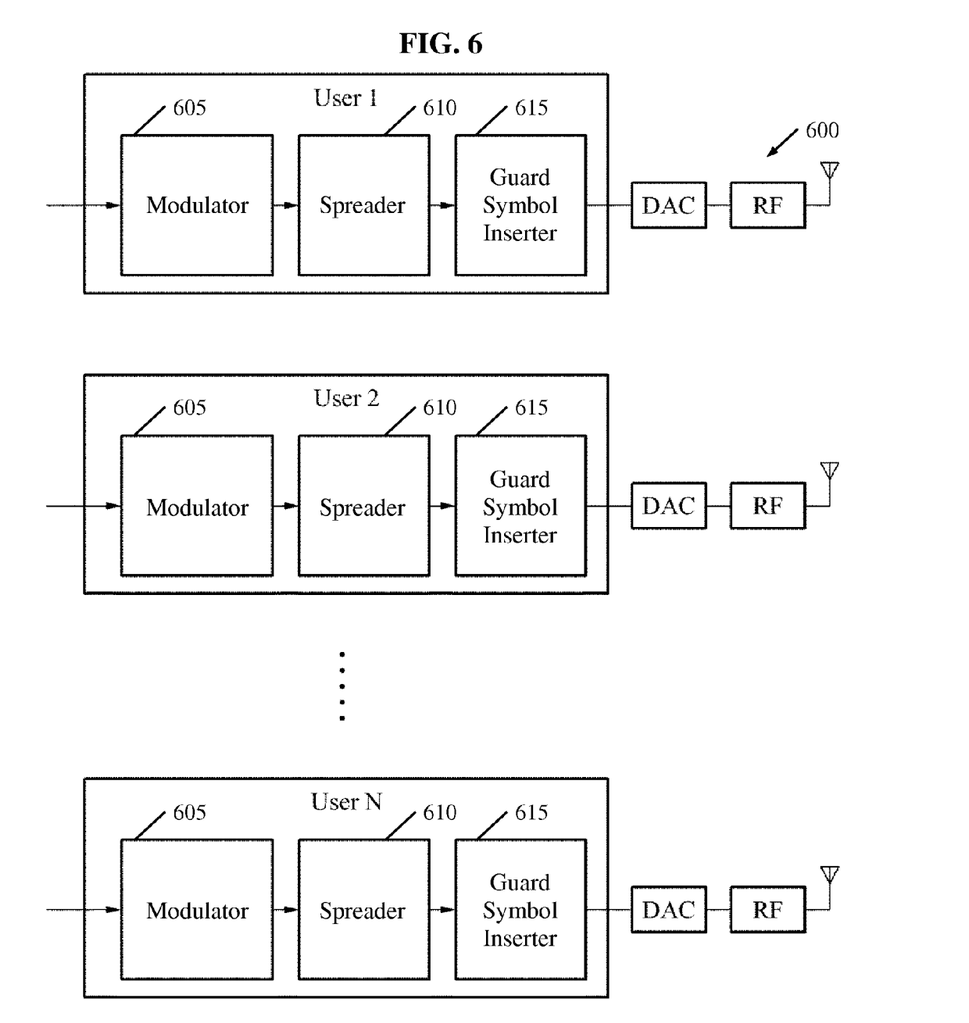
FIG. 6 is a block diagram illustrating an example of a transmitter of a SC-FDE system with per-tone spreading based multiple access in an uplink.

FIG. 6 is a block diagram illustrating an example of a transmitter 600 of a SC-FDE system with per-tone spreading based multiple access in an uplink. In the example of the uplink, each user of a single carrier block transmission transmits data independently to a base station.

At the transmitter 600, modulators 605 generate modulated data symbols, using, for example, M-PSK or M-QAM, from binary digits for each sub-band. Spreaders 610 perform per-tone spreading on the modulated data symbols. After per-tone spreading, guard symbol inserters 615 insert guard symbols in the spread data symbols.

Further, as shown in FIG. 6, each user at the transmitter side transmits data individually to the corresponding base station. The base station combines all the users at the receiver side. In this way, the method of per-tone spreading can be used to provide multiple accesses among many users employing single carrier block transmissions. Further, the method of per-tone spreading based multiple access in the uplink can be used as an alternative to a single carrier frequency division multiple access (SC-FDMA) system. All of the users share the same bandwidth. The method is advantageous as the transmitter 600 is simplified, and the PAPR may be made low as in single carrier modulation schemes. Further, the performance may be improved in comparison with an equivalent OFDM system. Also, non linear equalization methods can be exploited to improve the performance. The advantage of the per-tone spreading method disclosed herein is applicable for the uplink in high data rates. This is because the user equipment which can be a mobile device, and is typically battery driven and hence energy constrained. Also, an access point or base station can afford increased complexity to improve the performance depending on the requirements.

Figure 7:
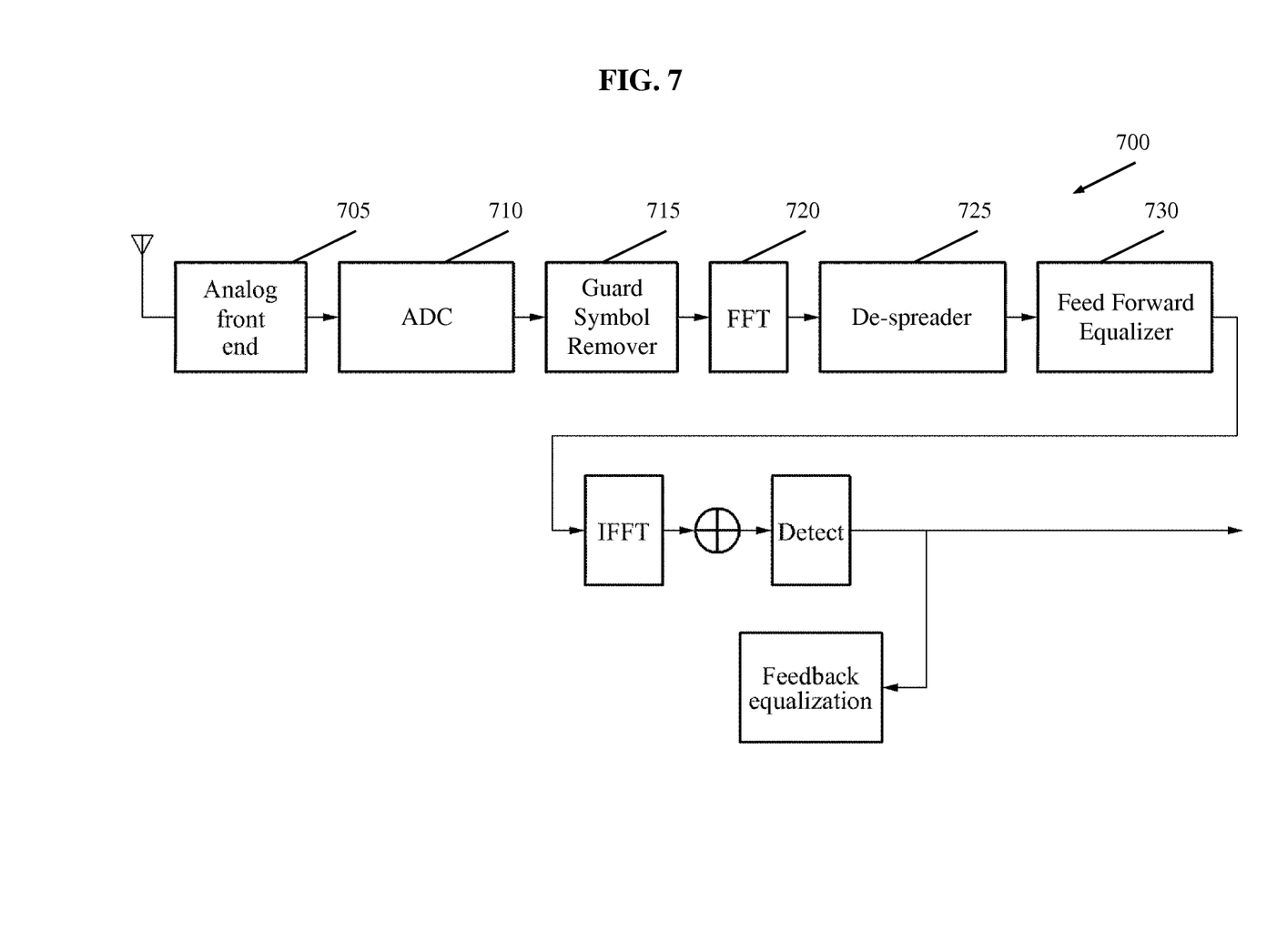
FIG. 7 is a block diagram illustrating an example of a receiver of a SC-FDE system with per-tone spreading based multiple access.

FIG. 7 is a block diagram illustrating an example of a receiver 700 of SC-FDE system with per-tone spreading based multiple access. The receiver 700 includes an analog front end 705, an ADC 710, a guard symbol remover 715, a FFT 720, a de-spreader 725, and a feed forward equalizer 730, which may perform the same operations as the analog front end 405, the ADC 410, the guard symbol remover 415, the FFT 420, the de-spreader 425, and the feed forward equalizer 430, respectively, of FIG. 4. Accordingly, details of such operations have been described with reference to FIG. 4, and are omitted herein for conciseness.

In detail, after RF or analog front end processing, the ADC 710 samples band limited signals at least at the Nyquist rate. After appropriate guard symbol processing, a DFT operation is performed on a number of received symbol blocks equal to a spreading factor. A de-spreading operation is performed along each tone of DFT output samples.

The per-tone de-spreading operation is employed to separate desired user signals from unwanted users within the same bandwidth. After the de-spreading operation, one tap frequency domain equalization is carried out using an estimate of channel coefficients. The equalized symbols are then sent for further typical receiver processing like symbol detection channel decoding. In this example, even though two DFT operations are performed in the receiver 700, the overall complexity is appreciably reduced when the sub-sampled OFDM based sub-band system is considered.

The various elements and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

As a non-exhaustive illustration only, a device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

What is claimed is:

1. A method of per-tone spreading in single carrier block transmissions, wherein an entire frequency band is equally divided into subbands, the method comprising:
   modulating incoming data into modulated symbols from binary digits for each of the subbands;
   dividing the modulated symbols into different blocks in each of the subbands;
   inserting a first guard symbol in each of the blocks;
   performing the per-tone spreading on the blocks in which the first guard symbol being inserted in each of the subbands; and
   combining the subbands to be transmitted as a signal through the entire frequency band,
   wherein the performing comprises multiplying each of the blocks with each of chips of a spreading sequence among spreading sequences that are orthogonal to each other,
   wherein the number of times the multiplying each of the blocks being carried depends on a spreading factor related to the spreading sequences,
   wherein the spreading sequences are unique to each of the subbands.

2. The method as in claim 1, wherein the performing comprises performing the per-tone spreading in a sub-band of the single carrier block transmissions, or for a user of the single carrier block transmissions.

3. The method as in claim 1, wherein a number of multiplications of the modulated symbols with each of the chips is equal to a number of the chips.

4. The method as in claim 1, further comprising:
   inserting a second guard symbol after the block of the modulated symbols, in response to the performing of the per-tone spreading.

5. The method as in claim 1, wherein the dividing and the performing is performed in each of the sub-bands of the single carrier block transmissions, or for each of users of the single carrier block transmissions.

6. A non-transitory computer-readable storage medium storing a program comprising instructions to cause a computer to perform the method of claim 1.

7. A transmitter configured to perform per-tone spreading in single carrier block transmissions, wherein an entire frequency band is equally divided into subbands, the transmitter comprising:
   a modulator configured to modulate incoming data into modulated symbols from binary digits for each of the subbands;
   a divider configured to divide the modulated symbols into different blocks in each of the subbands; and
   a guard symbol inserter configured to insert a first guard symbol in each of the blocks;
   a spreader configured to perform the per-tone spreading on the blocks in each of the subbands; and
   an adder configured to combine the subbands to be transmitted as a signal through the entire frequency band,
   wherein the spreader is configured to multiply each of the blocks with each of chips of a spreading sequence among spreading sequences that are orthogonal to each other,
   wherein the number of times the multiplying each of the blocks being carried depends on a spreading factor related to the spreading sequences,
   wherein the spreading sequences are unique to each of the subbands.

8. The transmitter as in claim 7, wherein the spreader is configured to perform the per-tone spreading in a sub-band of the single carrier block transmissions, or for a user of the single carrier block transmissions.

9. The transmitter as in claim 7, wherein the guard symbol inserter is configured to insert a second guard symbol after the block of the modulated symbols, in response to the performing of the per-tone spreading.

10. The method as in claim 1, wherein a number of times a multiplication of a block of modulated symbols with each chips of a spreading sequence is based on a spreading of the spreading sequence.

* * * * *